March 3, 1953 C. W. WILSON 2,630,279
FISHING REEL
Filed Oct. 23, 1950
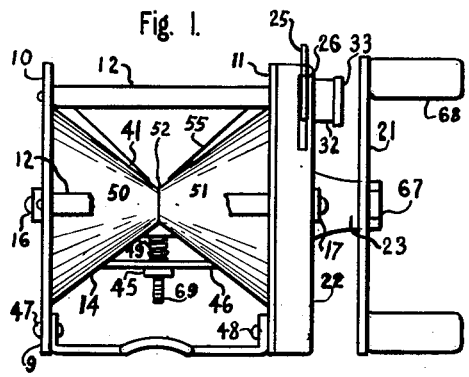
Fig. 1.
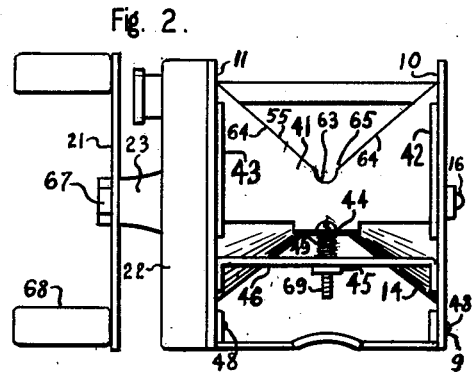
Fig. 2.
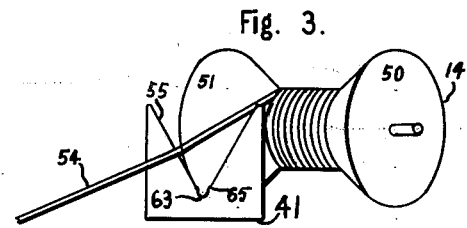
Fig. 3.
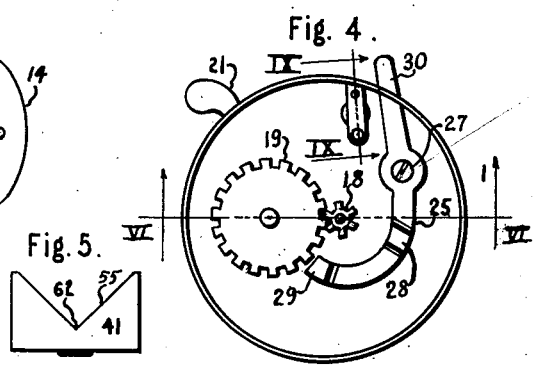
Fig. 4.
Fig. 5.
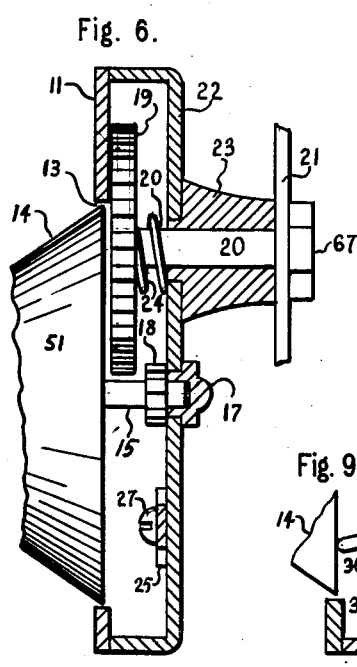
Fig. 6.
Fig. 7.
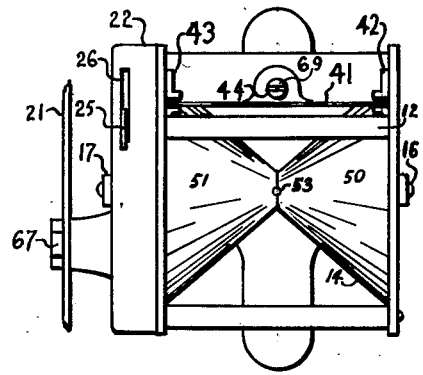
Fig. 8.
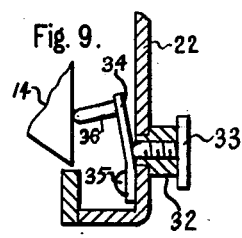
Fig. 9.
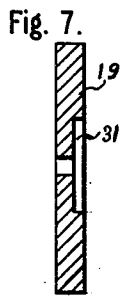
Inventor:
CHARLES W. WILSON.
by Orel Z. Burdick
Attorney.

Patented Mar. 3, 1953

2,630,279

UNITED STATES PATENT OFFICE 2,630,279

FISHING REEL

Charles W. Wilson, Norton Township, Muskegon County, Mich.

Application October 23, 1950, Serial No. 191,546

9 Claims. (Cl. 242—84.4)

This invention relates to a fishing reel and more particularly to a free running type having a self-contained level winding guide.

One disadvantage with many fishing reels now on the market is that the level winding mechanism, often consisting of several moving parts including the driving gears and winding handle, is geared to the spool and exerts a drag or braking action when the bait to be cast is first set in motion. After that, the momentum or flywheel action of this associated mechanism causes the spool to turn faster than the bait can carry out the line. The result is that the spool unwinds the line faster than needed, often winding it up in the other direction causing what is known as a backlash.

The way this is overcome in the conventional reel is by means of external drag adjustments. If enough drag is provided to balance this flywheel action, the result is a short, jerky cast at its best, and often the desire of one doing casting is to get as long a cast as possible.

This difficulty is well illustrated by the fact that reels used in tournaments have no level winding guide of any kind, this function being performed by hand. Such reels cast much further than conventional ones, but the disadvantage of having to guide the line by hand is too great for such reels to be popular among fishermen.

In order to avoid this difficulty I have devised a winding means in which the spool is the only part that moves during casting, so that only the inertia of the spool and line have any effect on the cast. My reel also has the additional advantage of being cheaper to manufacture than previous types having a larger number of parts.

It is, therefore, an object of my invention to provide a fishing reel in which the level winding guide has no moving parts. It is a further object of my invention to provide a reel in which the amount of drag on the spool is adjustable and in which the minimum amount of drag will be less than in previous devices. It is an additional object of my invention to provide a reel that will be cheaper to manufacture. Other and further objects of my invention will be evident from this specification and claims and from the accompanying drawing.

As shown in the drawing,

Fig. 1 is a right elevational view of my improved reel.

Fig. 2 is a left elevational view of the reel shown in Fig. 1.

Fig. 3 is a perspective view of the spool and guide, showing the relationship between these parts and the line.

Fig. 4 is an elevational view of the inside of the gear box of my reel showing the internal mechanism.

Fig. 5 is an elevational view of the guide from my winding device showing a modified structure.

Fig. 6 is a section taken along the line VI—VI of Fig. 4 with parts broken away.

Fig. 7 is a sectional view of the drive gear of my reel taken along the said line VI—VI of Fig. 4.

Fig. 8 is a top plan view of the reel shown in Fig. 1.

Fig. 9 is a partial section taken along the line IX—IX of Fig. 4.

As shown in the drawings, my reel comprises a frame shown generally at 9, formed from a back plate 10 and a front plate 11, connected by a plurality of posts as at 12. The front plate 11 has an opening at 13 through which is inserted a spool 14 which has a central shaft 15 protruding at each end and turning in the bearings 16 and 17. One end of said shaft carries a pinion gear 18, which meshes with a larger drive gear 19 which is attached to a shaft 20, on the opposite end of which is a crank 21 held in place by a nut 67. The crank 21 is provided with one or more handles as at 68. Said gears are located in a housing 22 attached to which is a support and bearing member 23 which supports the said shaft 20. Between the large gear 19 and the housing 22 is a spring 24 which exerts force to hold the said gear 19 over against the front plate 11 in the position shown in Fig. 6.

Also attached to the housing 22 is a lever 25, one end of which extends out of said housing through a slot 26, and is held in place by a screw 27. This lever 25 lays against the said housing at the screw 27 but is offset at 28 so that its lower end is positioned above the large gear 19 at 29. The end of the lever 25 is bent upwardly at 29 so that when the said lever is depressed by pushing down on its outer end at 30 the portion at 29 will slide over the gear 19, pushing it downward against the force of the spring 24 until gears 18 and 19 are in mesh. A recess 31 is provided in gear 19 to accommodate the spring 24 when in this depressed position.

The housing 22 also contains a drag mechanism comprising a boss 32, a screw 33 threaded therein and engaging spring 34, one end of which is attached to the housing 22 by a rivet or other fastening as shown at 35. The spring 34 carries on its free end a stud 36 of fibre or other friction material which bears on the end of the spool 14. This produces a uniform friction or drag effect on the spool 14, the amount of which is adjustable by means of the screw 33. This arrangement keeps the amount of drag uniform even though there may be slight irregularities in the surface of the spool 14.

My winding guide comprises a plate 41 which may or may not have an adjustable relationship to the spool 14. In the modification shown, I have provided a vertical adjustment in the form of two pairs of guides, one of which, shown at 42 is attached to the backplate 10 and the other, 43, is attached to the front plate 11. Plate 41 is set in these guides and is secured in place by a screw 69 which passes through a hole at 44 and screws into a boss 45 on a plate 46 which is secured to the back plate 10 and the front plate 11 by soldering, welding, riveting or other suitable means at the points 47 and 48. A spring 49 holds the plate 41 against the under side of the head of the screw 69.

The spool 14 is in the form of two truncated cones 50 and 51 with their small ends joined together as shown at 52. A hole 53 is provided for tying the fishline shown at 54. The plate 41 has a V-shaped cut away portion at its upper edge as shown at 55. While this V-shaped slot or cut-out portion in the guide plate 41 may come to a point at its vertex as shown at 62, my preferred modification has a semicircular form at this point as shown at 63. I also prefer that the points where this semicircular portion 63 meets the straight sides 64 of the V-shaped slot 55 be made convex or rounded as shown at 65. I have found that this contour at the bottom of the V-slot 55 aids in getting the line 54 started correctly on the spool 14.

Some variation is permissible in the angle which is made between the surfaces of the cones 50 and 51 at their line of contact at 52. I have found that best results are obtained when this angle is about 108°. The angle of the V-groove in the guide 41 is preferably slightly smaller or about 98°, though this angle may vary and angles as little as 6° or as much as 18° less than the angle between the cones 50 and 51 will be operative.

The said angle at 52 is not extremely critical and may be varied somewhat. For example, the angle between the cones at 52 may be as small as 90° or as large as 120° without sacrificing the advantages of my invention, and if some distortion from the conventional shape and proportion of a fishing reel is unobjectionable, this angle may be varied even further or from about 80° to 130°.

The best adjustment of my V-guide 41 will depend on the size of the line 54 and the direction at which it leaves the spool 14. This direction is determined by the construction of the fish pole with which the reel is to be used and the position of the first eyelet through which the line passes after leaving the spool 14. The V-guide can be adjusted to the most advantageous position for use with the pole selected by turning the screw 69.

When reeling in line, my device works as follows: The line 54 winds on spool 14 until it approaches one of the truncated cones, for example cone 50, at which time the line 54 contacts the guide 41. The tendency will be for the line to lay down successive turns in the same direction until the cone 50 is reached. However, as this process continues, guide 41 exerts greater and greater force against the line until the turns overlap and the line starts laying down in the opposite direction, moving away from the guide 41 until the opposite cone is approached, at which time the process is repeated. When the position of guide 41 is properly adjusted, this overlap and change of direction of wind will occur just as the line contacts the cone. This results in the line being wound level on the spool so that it will reel out without tangling or binding.

In use, the screw 33 on the reel is adjusted to produce the proper drag for the weight of the bait or fly being used, and the line is cast in the usual manner with the lever 25 pushed upward so that the gears 18 and 19 are not in mesh. Then the lever 25 is depressed, placing the gears in mesh, and the line is reeled in. One of the advantages of my reel is that, drag from any gear or winding mechanism being absent, lighter lines and baits may be used, and with proper adjustment of the drag by means of screw 33, a much better anti-backlash action will be obtained than with previous types. For best results the spool 14 should be very light, a hollow construction being preferable for extreme lightness. The extra momentum of a heavy spool contributes to backlash, and the momentum of the gears and other associated parts in a conventional type reel is as objectionable as their friction or drag effect when they remain connected to the spool during casting.

While I have offered one theory explaining the operation of my reel, I do not propose having the scope of any patent granted on this application be limited by this explanation which is given merely to facilitate an understanding of my device. It may be that better theories will be found for explaining the reasons for the superior performance of the reel described herein.

I am aware that numerous changes may be made and many details of construction may be varied through a wide range without departing from the principles of my invention, and I, therefore, do not propose limiting the patent granted hereon otherwise than necessitated by the scope of the appended claims.

I claim as my invention:

1. In a fishing reel, the combination of a spool formed from two cones joined at their small ends and a guide containing a V-shaped slot through which fish line passes before winding on said spool, the width of said slot being substantially equal to the distance between the bases of said cones.

2. In a fishing reel, the combination of a spool for holding fish line, said spool being formed from two truncated cones joined at their small ends, and a guide containing a V-shaped slot through which the line passes before winding on said spool, the angular size of said V-shaped slot being slightly smaller than the angle formed by the surfaces of said two cones, and the width of said slot being substantially equal to the distance between the bases of said cones.

3. In a fishing reel, the combination of a spool for holding fish line, said spool being formed from two cones joined at their small ends, and a guide containing a V-shaped slot through which the line passes before winding on said spool, the vertex of said V-shaped slot having a semicircular contour, and the width of said slot being substantially equal to the distance between the bases of said cones.

4. In a fishing reel, the combination of a spool for holding fish line, and a guide through which said line passes before winding upon said spool, said spool comprising two cones joined at their small ends, the surfaces of said cones making an angle with each other of between 80° and 130° and a V-shaped slot in said guide, the angle formed by the sides of said slot being at least 6 degrees and not more than 18 degrees less than the said first mentioned angle.

5. In a fishing reel, the combination of a spool for holding fish line, and a guide through which said line passes before winding on said spool, said spool having a groove for holding the said line, said groove having conical walls, the surfaces of said conical walls making an angle with each other of between 90° and 120°, and a V-shaped slot in said guide, the angle formed by the sides of said slot being at least 6 degrees and not more than 18 degrees less than the said first mentioned angle.

6. In a fishing reel, the combination of a spool for holding fish line, and a guide through which said line passes before winding on said spool, said spool having a groove for holding the said line, said groove having conical walls, the surfaces of said conical walls making an angle with each other of approximately 108°, and a V-shaped slot in said guide, the angle formed by the sides of said slot being less than said first mentioned angle by approximately 10°.

7. In a fishing reel including a frame therefor, the combination of a spool for holding fishline, said spool being formed from two truncated cones joined at their small ends, and a guide containing a V-shaped slot through which a fishline passes before winding on said spool, the angular size of said slot being slightly smaller than the angle formed by the surfaces of said two cones, said guide being mounted on said frame in a fixed position, the width of said V-shaped slot being substantially equal to the distance between the bases of said cones.

8. In a fishing reel, including a frame, the combination of a spool for holding fish line, said spool comprising two cone shaped members joined at their small ends, and a line guide containing a V-shaped groove with one open side, said open side having a length substantially equal to the distance between the bases of said cones, and a mounting means on said frame for supporting said guide with said open side parallel to the axis of said spool.

9. In a fishing reel including a frame therefor, a spool for holding fishline, said spool being formed from two truncated cones joined at their small ends, two guideways mounted on said frame and extending at right angles to the direction of the axis of said spool, each of said guideways being positioned adjacent to an end of said spool, a guide containing a V-shaped slot mounted in said guideways and manual means for adjusting the position of said guide in said guideways, said slot having a width substantially equal to the width of said spool.

CHARLES W. WILSON.

REFERENCES CITED

The following references are of record in the file of this patent:

UNITED STATES PATENTS

| Number | Name | Date |
|---|---|---|
| 477,196 | Wilcox | June 14, 1892 |
| 1,151,349 | Flegel | Aug. 24, 1915 |
| 1,456,283 | Schmid | May 22, 1923 |
| 1,472,684 | Schmid | Oct. 30, 1923 |
| 1,630,779 | Brislin | May 31, 1927 |
| 1,759,065 | Russell et al. | May 20, 1930 |
| 1,761,750 | Schafer | June 3, 1930 |
| 1,861,819 | Russell | June 7, 1932 |
| 1,864,146 | Pflueger | June 21, 1932 |
| 1,942,710 | Kautzky | Jan. 9, 1934 |
| 2,155,753 | Cook | Apr. 25, 1939 |
| 2,243,624 | Gazet | May 27, 1941 |
| 2,323,987 | Foster | July 13, 1943 |
| 2,546,559 | Nix | Mar. 27, 1951 |

FOREIGN PATENTS

| Number | Country | Date |
|---|---|---|
| 25,843 of 1909 | Great Britain | June 9, 1910 |